Figure 1:
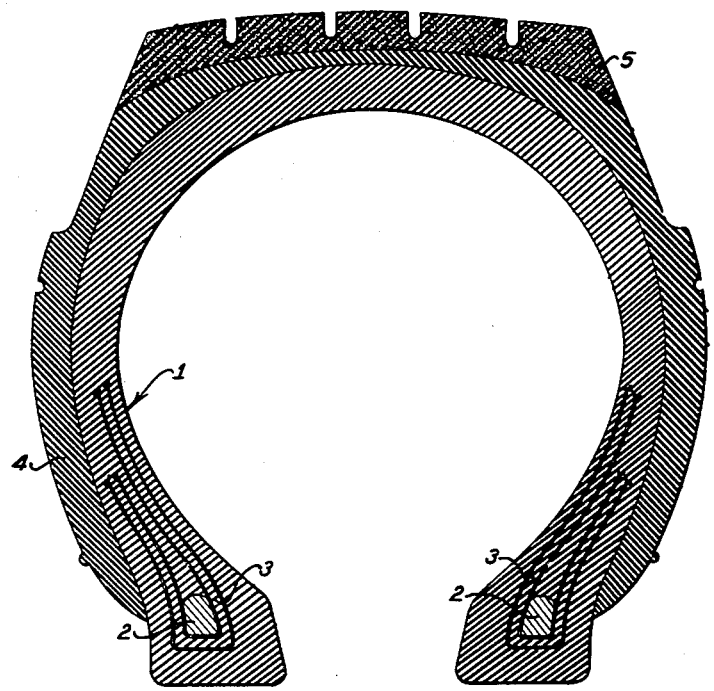

Nov. 6, 1962  F. A. CLARK ET AL  3,062,255
ANTI-SKID TIRE
Filed Feb. 18, 1960

INVENTORS
JOHN H. VICKERS
FRANCIS A. CLARK

BY *Fisher, Christen & Goodson*

ATTORNEYS

United States Patent Office 3,062,255
Patented Nov. 6, 1962

3,062,255
ANTI-SKID TIRE
Francis A. Clark, 212 Morris St., and John H. Vickers, 1716 Franklin Ave., both of Charleston, W. Va.
Filed Feb. 18, 1960, Ser. No. 9,540
6 Claims. (Cl. 152—211)

This invention relates to pneumatic tires, and more particularly to anti-skid tires which are particularly effective on slick, wet pavement but are also effective in avoiding skid on snow and ice and to processes for making said tires.

In the past, skid-resisting tires have been made by incorporating various materials into pneumatic tire treads, some of which materials were in particulate form and adapted to wear faster than the surrounding rubber and shortly after initiation of use, evacuate from the tire, leaving small cavities, thus providing an irregular surface intended for gripping a slippery surface. Such materials included wood particles, cork particles, particles of salt, sagograin and the like. While the roughness provided by the cavities formed by evacuation of the particulate material incorporated in the tread surface provided some advantages in improved traction, tires made in this fashion were unsatisfactory for adverse conditions of snow, ice, and especially, thin films of water on the road surface. It has been observed that the roughened surface as provided by the prior anti-skid tires described above tends to smooth out under the pressure of an automobile and lose its effectiveness, particularly when in contact with a hard road surface having a thin, slipper film of water on it.

Other prior anti-skid tires incorporated hard wear-resistant materials such as metal rods and spring segments in the tread surface. These metal rods or spring segments were designed to bite into the road surface in order to provide a more secure grip of the tire on the road surface. Tires of this type were not entirely satisfactory because of the roughness of ride provided to the vehicle employing the tire and because of difficulties in retaining the metal rods or spring segments in the tire tread. The tendency in this case is for the rubber material to wear down faster than the metal rods or spring segments, and thus permit said rods or spring segments to loosen and eventually drop out from the tire surface, thus reducing the anti-skid effectiveness suddenly and unexpectedly.

In instances where metal particles have been used as an ingredient in rubber tire treads to inhibit skidding tendences, it has been found that the sharp angular surface characteristic of the metal particles drastically reduce the useful life of the tire by cutting and biting into the rubber induced by the flexing incurred during normal use of the tire. While such metal particles and other sharp angular particles are effective in varying degrees to inhibit skidding they at the same time weaken the tire into which they are incorporated and increase the dangers of blowout. When wood particles or other low heat-resistant materials are used the extreme heat generated while the tire is in use, and particularly on hot pavements tends to disintegrate the wood particles forming gas pockets which detract from the strength of the tire and thereby increase the dangers of tire failure and blow-outs.

Irregular surfaces have been proposed for tire surfaces since the early 1900's, specific reference being herein made to United States Patent 796,400 to Franklin H. Bowly. This patent discloses a tire and wheel for wagons or the like wherein the tire is of the non-pneumatic type having a roughened surface layer attached to a resilient rubber base which in turn is secured to the wheel rim. The surface layer is made of two or more materials of different degrees of toughness whereby the softer material will wear faster than the harder material to leave a roughened surface after use. Tires of the type disclosed in the Bowly patent are entirely unsatisfactory for use on modern high-speed vehicles. The roughened surfaces of such tires are inflexible, weak and subject to break-down because of the weak bonds by and between the various ingredients of which the above-mentioned surfaces are made.

It is an object of this invention to provide an anti-skid, pneumatic tire which is highly effective in reducing skidding tendencies on snow, ice or wet pavement and is particularly effective when employed on high-speed vehicles.

Another object is the provision of tire tread material, commonly called "camel-back" by those skilled in the art, for vulcanization to worn but still well-constructed tires for providing a new tread surface which is capable of inhibiting tendencies of the tire to skid on slippery pavement.

Another object is the provision of tires and tread material which are strong and durable over long periods and are not substantially weakened by virtue of their remarkable anti-skid properties.

Still another object of this invention is to provide a process of manufacturing anti-skid, pneumatic tires and tire tread material having unexpected anti-skid, strength and wearability as set forth in the preceding objects.

A further object is the provision of a strong, wear-resistant anti-skid pneumatic tire or camel-back wherein no tread design is necessary to impart traction to the tire.

Figure 2:
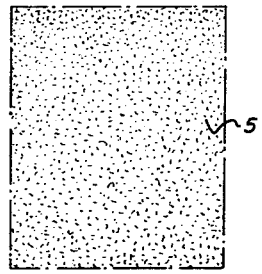
Figure 3:
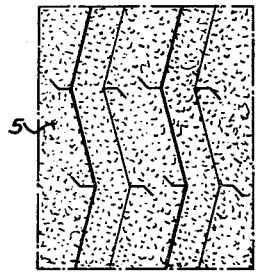

These and other objects and advantages of this invention will be apparent in particular from the following detailed description made with reference to the accompanying drawing in which:

FIG. 1 is a cross-section of the novel pneumatic tire described herein;

FIG. 2 is a fragmentary plan view showing a pneumatic tire tread surface on camel-back, or on a pneumatic tire thereby illustrating an embodiment of this invention wherein no tread design is employed; and FIG. 3 is a fragmentary plan view showing a pneumatic tire surface on camel-back, or on a pneumatic tire, thereby illustrating an embodiment of the invention wherein a tread design as shown is employed.

Referring to FIG. 1 of the drawings there is shown a cross-section of a pneumatic tire comprising a casing 1 having inextensible bead elements 2, strengthening cords 3, a sub-tread and side-wall portion 4 and a tread portion 5. The tread portion 5 has uniformly dispersed therein sand granules, as shown, which are strongly bonded into a homogeneous mass by a rubber matrix. The sand granules or particles are strongly bonded by and to the rubber matrix and are characterized by smooth, rounded surfaces which adhere remarkably with the rubber matrix but still do not cause damage thereto as by cutting or biting. Especially high grade tires can be made with high purity sand, commonly known as glass-makers' sand. For best results in wearability, strength and skid inhibition glassmakers' sand is employed. It has been found also that sand having particle sizes of one-eighth to one-sixty-fourth of an inch in diameter provide the outstanding results herein described.

The homogeneous distribution of the sand granules throughout the rubber matrix of the tread portion 5 provides a surface having substantially the same degree of skid inhibition regardless of the amount of wear the tire has undergone. In other words, as the tread portion wears through continued usage each new surface exposed by previous wear has substantially the same degree of skid resistance as any previous surface. As a result the operator of a vehicle using the tires of this invention can depend upon the same degree of skid protection regardless of how much of the tread remains after wear.

An outstanding feature of the novel tires or tread material disclosed herein is the ability of the tire or tread material to hold the sand particles in cohesion with the rubber matrix. Manifestations of this ability are greatly improved anti-skid properties and substantial reduction or elimination of rapid depletion of the tread portion caused by release and loss of sand granules therefrom. In addition, the absence of air cavities or films adjacent to the sand-rubber interface which is characteristic of the tires and camel-back of this invention results in strength and internal wear resistance which ordinarily are not obtainable by prior anti-skid tires and camel-back. The absence of such air pockets or films and the strong cohesion of the sand and rubber prevents movement of the sand in relation to the rubber and the consequent internal friction wear on the rubber.

The invention can be applied to automotive vehicular use, e.g., on automobiles, trucks, tractors and buses, as well as on the landing apparatus of aircraft. The rubber employed in the tires and camel-back of this invention is that presently employed in the manufacture of all types and compositions of tires and includes synthetic rubber, natural rubber, mixtures thereof or plastics or any mixture of natural or synthetic rubbers and/or plastics.

We have found that when about 5–25 weight percent of the granules of sand or cinders and from about 75–95 weight percent of a vulcanized rubber matrix are employed in manufacturing automotive tires and aircraft tires that optimum results are obtained.

FIG. 2 illustrates a tread surface in accordance with this invention having no tread design. Tires having this type of tread are of particular importance in that they provide a large friction contact surface for engagement with the road surface and thus provide a greater degree of traction with the road surface. FIG. 3 illustrates a tread surface having a tread design, which imparts the well-known wiping action to the road surface, in addition to the improved traction provided by the practice of this invention.

Cinders of the particle sizes disclosed above can be employed in place of sand with substantially the same bonding effect, and the resulting manifestations of strong bonding, as sand. Because of the smooth, round surface characteristics of sand particles, sand is particularly advantageous in averting internal wear of the rubber matrix as hereinbefore explained.

The novel process of this invention comprises drying sand or cinders to remove the substantial majority of water from the surface of the individual granules, mixing the granules with uncured tire-making rubber to form a homogeneous mixture and then molding and curing the mixture in the usual manner to make the tire or camel-back.

Any suitable means for drying the sand or cinders can be employed, e.g., with solvents such as acetone, by heating or otherwise. We have found that heating the sand or cinders to at least 212° F. for a period of time sufficient to drive off substantially all of the water present on the sand or cinders provides the outstanding advantages set forth herein.

Mixing can be performed in any suitable manner which will provide a homogeneous mixture of sand or cinders and rubber matrix. A Banbury mixer has been used with notable success in this regard.

Although the invention has been described in detail above, there are many variations and combinations that will occur to skilled workers whereby the disclosed invention can be utilized in many different forms and embodiments. In spite of the above detailed description the present invention is not to be limited to details as set forth above but is defined and only limited by the claims appended hereto.

What is claimed is:
1. In a pneumatic tire, a strong wear-resistant, anti-skid tread portion comprising dried granules from the class consisting of sand and cinders having a diameter of one-eighth to one-sixty-fourth of an inch bonded into a homogeneous mass by a vulcanized rubber matrix, said granules being dried by heating to at least 212° F. for a period of time sufficient to drive off substantially all the water present on said granules.

2. In a pneumatic tire, a strong wear-resistant, anti-skid tread portion comprising 5 to 25% by weight of heat-dried granules from the class consisting of sand and cinders having a diameter of one-eighth to one-sixty-fourth of an inch bonded into a homogeneous mass by 75 to 95% by weight of a vulcanizing rubber matrix, said weight percentages being based on the weight of said tread portion, said granules being dried by heating to at least 212° F. for a period of time sufficient to drive off substantially all the water present on said granules.

3. Tread strips for re-capping pneumatic tires to render said tires strong, wear-resistant and skid-inhibiting, said tread strips comprising dried granules from the class consisting of sand and cinders having a diameter of one-eighth to one-sixty-fourth of an inch bonded into a homogeneous mass by a vulcanized rubber matrix, said granules being dried by heating to at least 212° F. for a period of time sufficient to drive off substantially all the water present on said granules.

4. Tread strips for re-capping pneumatic tires to render said tires strong, wear-resistant and skid-inhibiting, said tread strips comprising 5 to 25% by weight of heat dried granules from the class consisting of sand and cinders having a diameter of one-eighth to one-sixty-fourth of an inch bonded into a homogeneous mass by 75 to 95% by weight of a vulcanized rubber matrix, said weight percentages being based on the weight of said tread strips, said granules being dried by heating to at least 212° F. for a period of time sufficient to drive off substantially all the water present on said granules.

5. A process for making a strong, wear-resistant, anti-skid, pneumatic tire which comprises drying granules from the class consisting of sand and cinders by heating said granules to at least 212° F., for a period of time sufficient to drive off substantially all the water present on said granules, mixing said dried granules with uncured rubber to form a homogeneous mass and making a pneumatic tire with said mass as the tread portion thereof.

6. A process for making a strong, wear-resistant, anti-skid, pneumatic tire which comprises drying granules from the class consisting of sand and cinders having a diameter of one-eighth to one-sixty-fourth of an inch by heating said granules to at least 212° F. for a period of time sufficient to drive off substantially all the water present on said granules, mixing said dried granules with uncured rubber to form a homogeneous mass and making a pneumatic tire with said mass as the tread portion thereof.

References Cited in the file of this patent
UNITED STATES PATENTS

| | | |
|---|---|---|
| 2,675,047 | Andy | Apr. 13, 1954 |
| 2,766,800 | Rockoff | Oct. 16, 1956 |

FOREIGN PATENTS

| | | |
|---|---|---|
| 5,005 | Great Britain | 1895 |